US009033806B2

(12) United States Patent
Bruzzese et al.

(10) Patent No.: US 9,033,806 B2
(45) Date of Patent: May 19, 2015

(54) GAMING MACHINE

(75) Inventors: Vincent Carmelo Bruzzese, Newington (AU); Scott Paul Shelley, Heathcote (AU); Peter Scott Clarebrough, Newington (AU)

(73) Assignee: Ainsworth Game Technology Limited, Newington, NSW (AU)

( * ) Notice: Subject to any disclaimer, the term of this patent is extended or adjusted under 35 U.S.C. 154(b) by 0 days.

(21) Appl. No.: 13/813,210

(22) PCT Filed: Aug. 4, 2011

(86) PCT No.: PCT/AU2011/000980
§ 371 (c)(1),
(2), (4) Date: Jan. 30, 2013

(87) PCT Pub. No.: WO2012/019218
PCT Pub. Date: Feb. 16, 2012

(65) Prior Publication Data

US 2013/0130809 A1 May 23, 2013

(30) Foreign Application Priority Data

Aug. 9, 2010 (AU) ................................ 2010903556

(51) Int. Cl.
*A63F 13/08* (2006.01)
*G07F 17/32* (2006.01)

(52) U.S. Cl.
CPC .................................. *G07F 17/3216* (2013.01)

(58) Field of Classification Search
CPC .................. A63F 2009/2457; A63F 2009/246; A63F 13/08; G07F 17/3202; G07F 17/3204; G07F 17/3209; G07F 17/3211; G07F 17/3216; G07F 17/3218
USPC ................................................ 463/30, 31, 46
See application file for complete search history.

(56) References Cited

U.S. PATENT DOCUMENTS 3,940,136 A * 2/1976 Runte ................................ 463/3
4,440,457 A * 4/1984 Fogelman et al. .............. 463/46
D280,836 S * 10/1985 Ludzia et al. ................ D21/325
5,344,199 A * 9/1994 Carstens et al. ................ 463/17
D354,637 S * 1/1995 Jarrett ............................ D6/432
5,456,468 A * 10/1995 Stringfellow et al. .......... 463/46
5,655,966 A * 8/1997 Werdin et al. .................. 463/25

(Continued)

FOREIGN PATENT DOCUMENTS

JP 2007-275353 10/2007
JP 2008-005979 1/2008
WO WO 03/015883 2/2003

OTHER PUBLICATIONS

"Wheel of Fortune," NPL dated Jul. 25, 2006.*

(Continued)

*Primary Examiner* — David L Lewis
*Assistant Examiner* — Matthew D Hoel
(74) *Attorney, Agent, or Firm* — Cook Alex Ltd.

(57) ABSTRACT

Described herein is a gaming machine (12) including a cabinet (12) having an upper portion (14) and a lower portion (16). A primary display (18) is disposed in the upper portion and a user interface (20) is disposed in the lower portion. The maximum frontal width of the lower portion is substantially less than the maximum frontal width of the upper portion such that a clearance is defined under the upper portion on each side of the lower portion.

9 Claims, 12 Drawing Sheets

(56) References Cited

U.S. PATENT DOCUMENTS

| | | | | |
|---|---|---|---|---|
| 5,813,914 | A * | 9/1998 | McKay et al. | 463/46 |
| 5,857,910 | A * | 1/1999 | Watanabe et al. | 463/17 |
| 6,164,645 | A * | 12/2000 | Weiss | 273/138.2 |
| 6,201,532 | B1 * | 3/2001 | Tode et al. | 345/156 |
| 6,231,446 | B1 * | 5/2001 | Majima et al. | 463/46 |
| 6,334,814 | B1 * | 1/2002 | Adams | 463/20 |
| 6,368,216 | B1 * | 4/2002 | Hedrick et al. | 463/20 |
| D459,402 | S | 6/2002 | Wurz et al. | |
| 6,435,970 | B1 * | 8/2002 | Baerlocher et al. | 463/46 |
| D464,377 | S | 10/2002 | Wurz et al. | |
| 6,475,087 | B1 * | 11/2002 | Cole | 463/20 |
| 6,514,145 | B1 * | 2/2003 | Kawabata et al. | 463/46 |
| 6,533,659 | B2 * | 3/2003 | Seymour et al. | 463/16 |
| 6,572,204 | B1 | 6/2003 | Hedrick et al. | |
| 6,623,006 | B2 * | 9/2003 | Weiss | 273/138.2 |
| 6,646,695 | B1 * | 11/2003 | Gauselmann | 349/58 |
| 6,688,984 | B2 * | 2/2004 | Cole | 463/46 |
| D495,755 | S | 9/2004 | Wurz et al. | |
| 6,820,875 | B1 * | 11/2004 | Hedrick et al. | 273/138.1 |
| 6,860,814 | B2 * | 3/2005 | Cole | 463/46 |
| 6,880,825 | B2 * | 4/2005 | Seelig et al. | 273/143 R |
| D508,961 | S | 8/2005 | Gatto et al. | |
| 6,962,528 | B2 * | 11/2005 | Yokota | 463/25 |
| 6,976,919 | B2 * | 12/2005 | Cole | 463/46 |
| 6,997,810 | B2 * | 2/2006 | Cole | 463/46 |
| D525,665 | S | 7/2006 | Karlsson | |
| 7,108,237 | B2 * | 9/2006 | Gauselmann | 248/220.22 |
| 7,241,222 | B2 * | 7/2007 | Cole | 463/46 |
| D563,481 | S | 3/2008 | Looks et al. | |
| 7,351,153 | B2 * | 4/2008 | Nagano | 463/46 |
| 7,374,491 | B1 * | 5/2008 | Johnson | 463/46 |
| D586,866 | S | 2/2009 | Hsu | |
| D594,068 | S | 6/2009 | Hsu | |
| D613,802 | S | 4/2010 | Meyers et al. | |
| D615,598 | S | 5/2010 | McComb et al. | |
| D616,039 | S | 5/2010 | Bruzzese et al. | |
| D622,323 | S | 8/2010 | De Viveiros Ortiz | |
| D626,603 | S | 11/2010 | Bruzzese et al. | |
| D636,822 | S | 4/2011 | Levitan et al. | |
| 7,927,218 | B2 | 4/2011 | Kopera et al. | |
| 8,002,637 | B1 * | 8/2011 | Mitchell | 463/46 |
| 8,012,028 | B1 * | 9/2011 | McNamara | 463/46 |
| 8,257,181 | B2 * | 9/2012 | Shimizu | 463/46 |
| 8,277,326 | B2 * | 10/2012 | Kuhn et al. | 463/46 |
| D684,637 | S * | 6/2013 | Shelley et al. | D21/370 |
| D684,638 | S * | 6/2013 | Shelley et al. | D21/370 |
| D684,639 | S | 6/2013 | Shelley et al. | |
| 8,596,604 | B2 * | 12/2013 | Kubach | 248/678 |
| 8,870,663 | B2 * | 10/2014 | Cole | 463/46 |
| 2002/0006828 | A1 * | 1/2002 | Gerding | 463/46 |
| 2002/0065132 | A1 * | 5/2002 | Stephan | 463/30 |
| 2003/0130033 | A1 * | 7/2003 | Loose | 463/30 |
| 2004/0002389 | A1 * | 1/2004 | Sartini | 463/46 |
| 2004/0087374 | A1 * | 5/2004 | Cole | 463/46 |
| 2004/0097285 | A1 * | 5/2004 | Fisher et al. | 463/24 |
| 2004/0142752 | A1 * | 7/2004 | Gauselmann | 463/46 |
| 2004/0152522 | A1 * | 8/2004 | Gerding | 463/46 |
| 2004/0162146 | A1 * | 8/2004 | Ooto | 463/46 |
| 2004/0192444 | A1 | 9/2004 | Morrison | |
| 2004/0224776 | A1 * | 11/2004 | Nagano | 463/46 |
| 2005/0026702 | A1 * | 2/2005 | Cole | 463/46 |
| 2005/0032578 | A1 * | 2/2005 | Cole | 463/46 |
| 2005/0049049 | A1 * | 3/2005 | Griswold et al. | 463/46 |
| 2005/0054449 | A1 | 3/2005 | Kopera et al. | |
| 2005/0085302 | A1 * | 4/2005 | Nicastro et al. | 463/46 |
| 2005/0107167 | A1 * | 5/2005 | Sasaki | 463/46 |
| 2005/0113174 | A1 * | 5/2005 | Izawa | 463/46 |
| 2005/0137019 | A1 * | 6/2005 | Ikeda | 463/46 |
| 2005/0215325 | A1 * | 9/2005 | Nguyen et al. | 463/46 |
| 2005/0255924 | A1 * | 11/2005 | Cole | 463/46 |
| 2005/0277477 | A1 * | 12/2005 | Hajder et al. | 463/46 |
| 2006/0131810 | A1 * | 6/2006 | Nicely | 273/292 |
| 2007/0207861 | A1 * | 9/2007 | Gawel et al. | 463/46 |
| 2008/0004099 | A1 * | 1/2008 | Ikeda | 463/16 |
| 2008/0113794 | A1 | 5/2008 | Cole | |
| 2008/0119263 | A1 | 5/2008 | Haga et al. | |
| 2009/0221375 | A1 | 9/2009 | Luciano, Jr. et al. | |
| 2009/0224473 | A1 | 9/2009 | Motegi et al. | |

OTHER PUBLICATIONS

Amatic Industires-GmbH—Slant Top retrieved from internet, URL:http:///web.archive.org/web/20091124055314/http://www.amatic.com/430.html published on Nov. 24, 2009 as per Wayback engine.

Asteroids, video game at arcade-history retrieved from internet: <URL:http://web.archive.org/web/20080511170321/http://www.archade-history.com/?n=asteroids&page=detail&ids=126> published on May 11, 2008 as per Wayback engine.

Australian Patent Office International-Type Search Report from Australian patent application No. AU2010903556, mailing date Oct. 22, 2010.

International Preliminary Report on Patentability for corresponding International application No. PCT/AU2011/000980, Dec. 10, 2012 completion date.

International Search Report from corresponding International application No. PCT/AU2011/000980, mailing date Oct. 6, 2011.

The 50 Greatest Arcade Cabinets in Video Game History retrieved from internet: <URL:http://web.archive.org/web/20080728103342/http://www.i-mockery.com/minimocks/50aracdecabinets/arcade2.php> published on Jul. 28, 2008 as per Wayback engine.

Examination report from corresponding Macao patent application No. I/001106 (534), dated Apr. 2, 2013 (partial translation included).

* cited by examiner

GAMING MACHINE

TECHNICAL FIELD

The present invention relates to gaming machines and in particular to slant top gaming machines used to play casino-type games.

The invention has been developed primarily with reference to a slant top gaming machine and will be described hereinafter with reference to this application. However, it will be appreciated that the invention is not limited to this particular field of use.

BACKGROUND

The following discussion of the prior art is intended to place the invention in an appropriate technical context and enable the associated advantages to be fully understood. However, any discussion of the prior art throughout the specification should not be considered as an admission that such art is widely known or forms part of the common general knowledge in the field.

Gaming machines for playing casino-type games are typically known to be of two main configurations. One common configuration is an upright gaming machine configuration, which is generally tall and narrow and configured to sit upon a pedestal or console. Multiple displays are located in an upper portion of the machine and a user interface including the button panel and coin and/or card inserting modules, are located in a lower portion. The front portion of an upright gaming machine normally includes a vertically hinged door, which usually opens to the left. Due to it having a generally vertically extending display, a player typically stands or sits on a tall stool, when using an upright gaming machine.

Another gaming machine configuration is the slant top gaming machine. A slant top machine is generally free standing, having a lower supporting portion and an upper display portion. The upper portion includes a sloping or slanted section where a slanted primary display is housed. The primary display is generally positioned at a shorter distance above the ground, relative to an upright machine, permitting a player to sit on a chair and slide their legs underneath the primary display in a similar way to sitting at a gaming table. A user interface having the button panel and coin/card modules are located in the lower portion.

A slant top gaming machine has a number of advantages, but also a number of drawbacks. As mentioned earlier, the primary advantage to the slant top is that it accommodates a seated player in much the same fashion as a conventional gaming table, which is convenient and comfortable for the player making slant top machine ideal for extended play. The slant top also has an outwardly extending armrest section which allows the user to rest their arms and other items.

The main drawback to the slant top gaming machine is that they are normally very heavy and have a large footprint making them difficult to relocate on a gaming floor. This means that a relatively lesser number of these machines can be placed on the same gaming or casino floor space compared to an upright gaming machine. Moreover, because of their generally stout appearance they also have to be placed at the front of a gaming floor or in more open spaces, so they can be seen.

In a similar vein, due to their generally wide footprint, another problem with slant top gaming machines is that they cannot be placed on a common base directly next to upright gaming machines because of their non modular design and interference when the vertically hinged door of an upright machine is opened. More specifically, when the vertically hinged door of an upright machine is opened, it traverses laterally outwardly to foul on the side of the slant top machine. Consequently, more clearance space is required between slant top and upright gaming machines, which results in a commercially undesirable reduced game machine density on the gaming floor.

Therefore, whilst slant top gaming machines are commercially attractive because they are comfortable and used for longer periods, their limited placement on a gaming floor results in inefficient and commercially unattractive gaming machine densities.

It is an object of the present invention to overcome or ameliorate at least one of the disadvantages of the prior art, or to provide a useful alternative.

It is an object of a preferred form of the present invention to provide a slant top gaming machine that can be placed on a gaming floor with minimal limitations.

SUMMARY OF THE INVENTION

According to a first aspect of the invention, there is provided a gaming machine including:

a cabinet having an upper and lower portion;

a primary display disposed in the upper portion; and a user interface disposed in the lower portion;

wherein the maximum frontal width of the lower portion is substantially less than the maximum frontal width of the upper portion such that a clearance is defined under the upper portion on each side of the lower portion.

In one embodiment, the lateral width of each clearance is substantially identical.

In one embodiment, the width of the lower portion is generally in the range of 70 to 90% of the width of the upper portion. Preferably, the width of the lower portion is generally in the range of 75 to 85% of the width of the upper portion. More preferably, the width of the lower portion is substantially 82% of the width of the upper portion.

In one embodiment, the width of the upper portion is approximately 560 mm.

In one embodiment, the gaming machine is a slant top gaming machine.

In one embodiment, the user interface includes a button panel.

In one embodiment, the gaming machine includes a pedestal for supporting the cabinet. Preferably, the pedestal is removable from the cabinet. Preferably, the pedestal has a frontal width, which is substantially the same as the maximum width of the lower portion.

In one embodiment, the gaming machine is a casino type gaming machine.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Reference throughout this specification to "primary display", "secondary display" or "supplementary display" means a video screen typically of the type, but not limited to, a liquid crystal display (LCD) or light emitting diode (LED)

video screen or both. However, it could also refer to a static display, an analogue video display or a touch screen video display.

Reference throughout this specification to “slant top”, “slant top gaming machine” or “slant top machine” means a gaming machine having a primary display that extends at approximately 0 to 45 degrees to the horizontal.

The term “gaming” throughout the specification should be considered in the sense of gambling-related gaming.

Any reference herein to “casino-type” games should not be read to infer any requirement that a game be played in a casino as such. The descriptor is simply used to differentiate gaming in the context of gambling-related gaming (e.g. electronic gaming machines in the form of slot/poker machines, electronic roulette games, jackpot controllers and the like) from gaming in the sense of video games played for recreational (non-gambling) purposes.

BRIEF DESCRIPTION OF THE DRAWINGS

Preferred embodiments of the invention will now be described, by way of example only, with reference to the accompanying drawings in which.

DESCRIPTION OF PREFERRED EMBODIMENTS OF THE INVENTION

Figure 1:
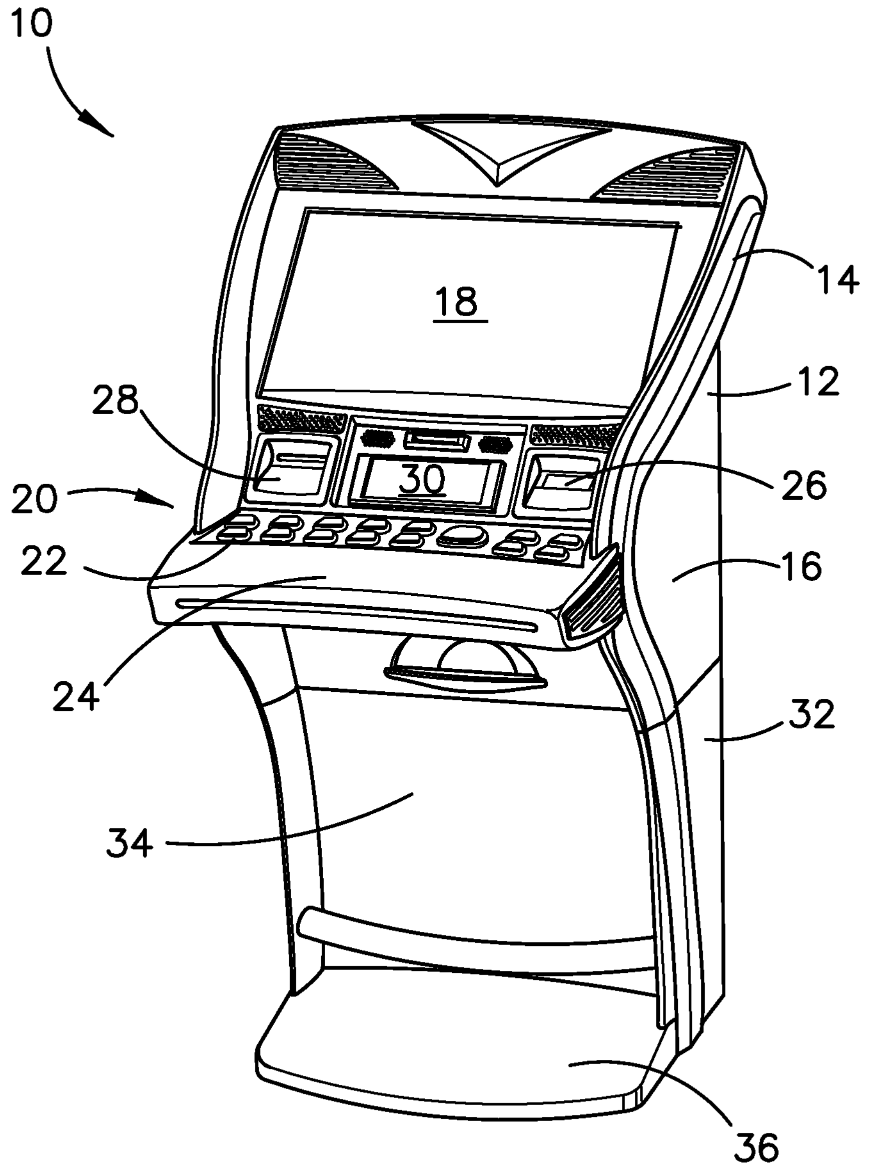
FIG. 1 is a perspective view of a gaming machine in accordance with the present invention.

Exemplary embodiments of the present invention will now be described in detail with reference to the accompanying drawings. In the drawings, the same elements are denoted by the same reference numerals throughout. In the following description, detailed descriptions of known functions and configurations incorporated herein have been omitted for conciseness and clarity.

The present invention relates to a gaming machine 10 of the type that is typically classified as a slant top gaming machine used to play casino-type games. As those familiar in this art would know, slant top gaming machines have an upper portion housing a main display, which is angled 0 to 45 degrees to the horizontal plane. Slant top gaming machines are considered comfortable to use making them ideal for extended period use. However, they are also relatively bulky, having wide heavy bases. This presents several problems with respect to their location on a gaming floor. This is contrary to upright gaming machines, which are more slender in appearance having a relatively smaller footprint and a generally vertical main display.

Referring to initially to FIG. 1, the gaming machine 10 of the present invention includes a cabinet 12 having an upper portion 14 and lower portion 16. The upper portion 14 houses an angularly extending primary display 18. The lower portion includes a user interface 20 having a button panel 22, hand/armrest 24, bill acceptor 26, ticket printer 28 and supplementary promotional module 30. In the embodiment shown on FIG. 1, a pedestal 32 having a relief area 34 and footrest 36 for a user’s legs when seated, is also provided. As can be seen, the pedestal is generally of the same width as the lower portion.

Gaming machine 10 is used like any other type of slant top machine, whereby a user sits at the gaming machine and engages the user interface 20 to play whatever game has been programmed. It will be appreciated that in addition to the keypad and depending on the program installed, the primary display 18 may also include a touch screen portion for user interaction.

Figure 2:
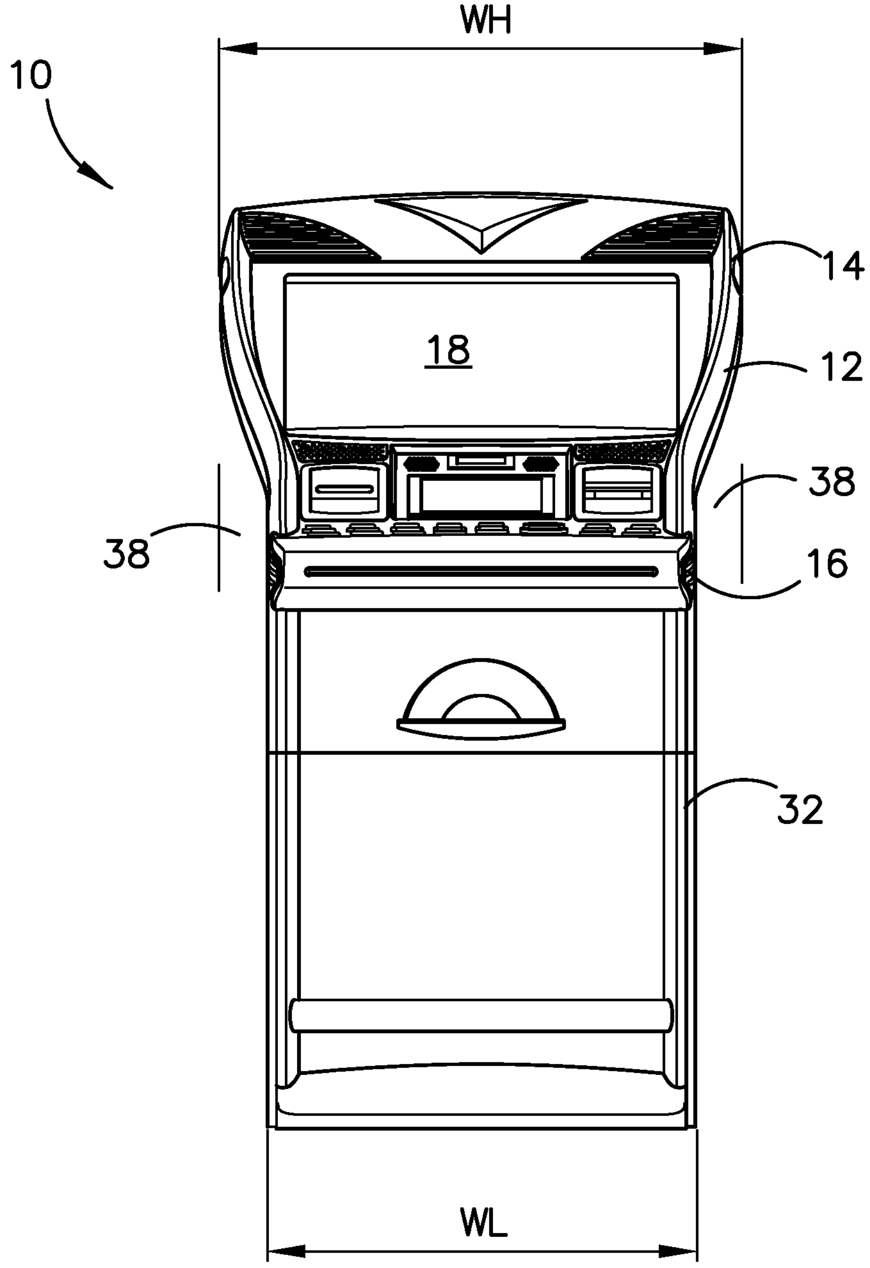
FIG. 2 is a front view of the gaming machine of FIG. 1.

As can be seen with reference to FIG. 2, in accordance with the present invention, the maximum frontal width WL of the lower portion 16 is substantially less than the maximum frontal width WH of the upper portion 14. As is evident, the frontal profile created by the difference in frontal widths defines a clearance area 38 under the upper portion 14 on each side of the lower portion 16. The purpose of these clearance areas will now be explained with reference to FIGS. 3 to 6.

Figure 3:
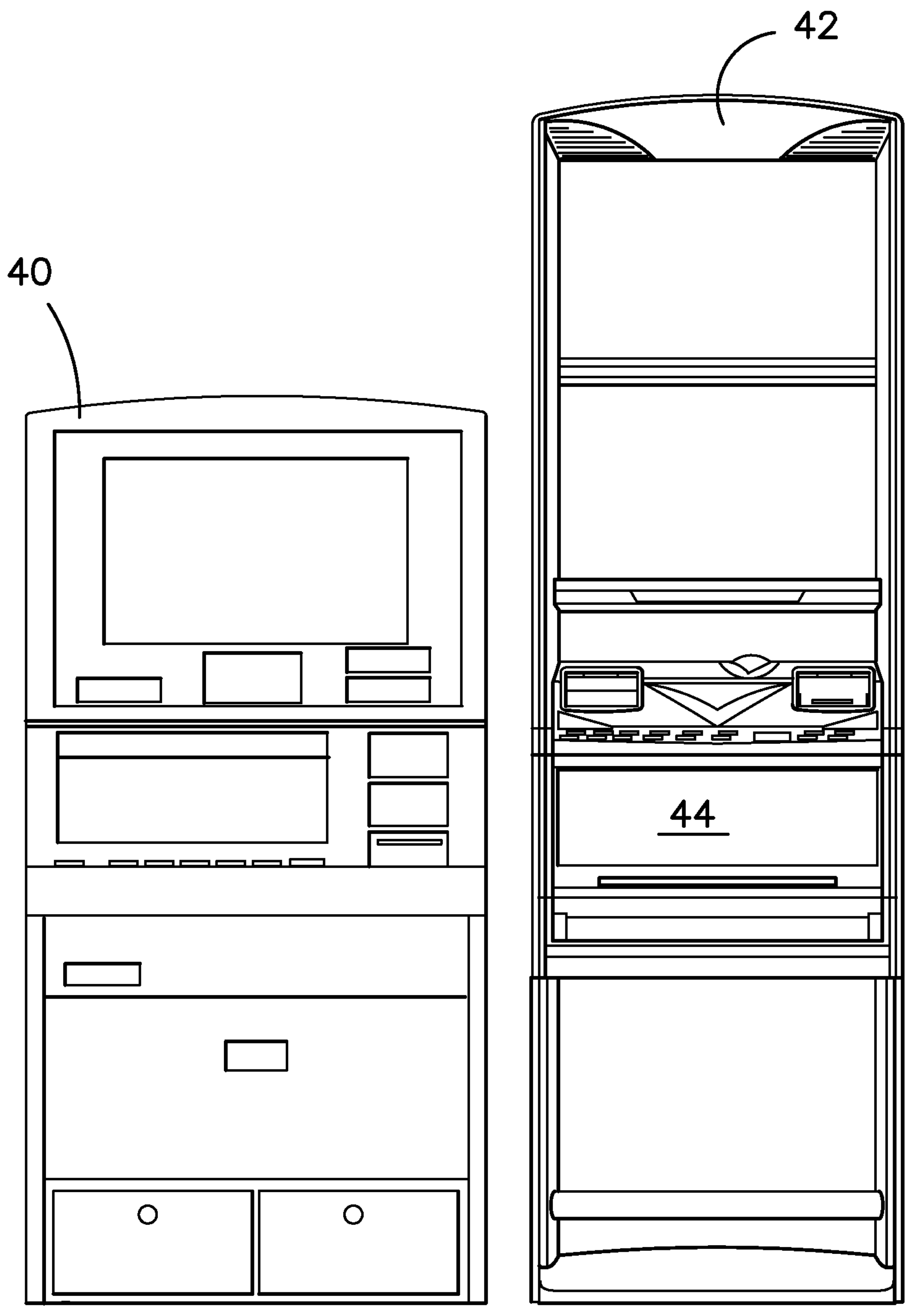
FIG. 3 is front view of a prior art slant top gaming machine next to an upright gaming machine.
Figure 4:
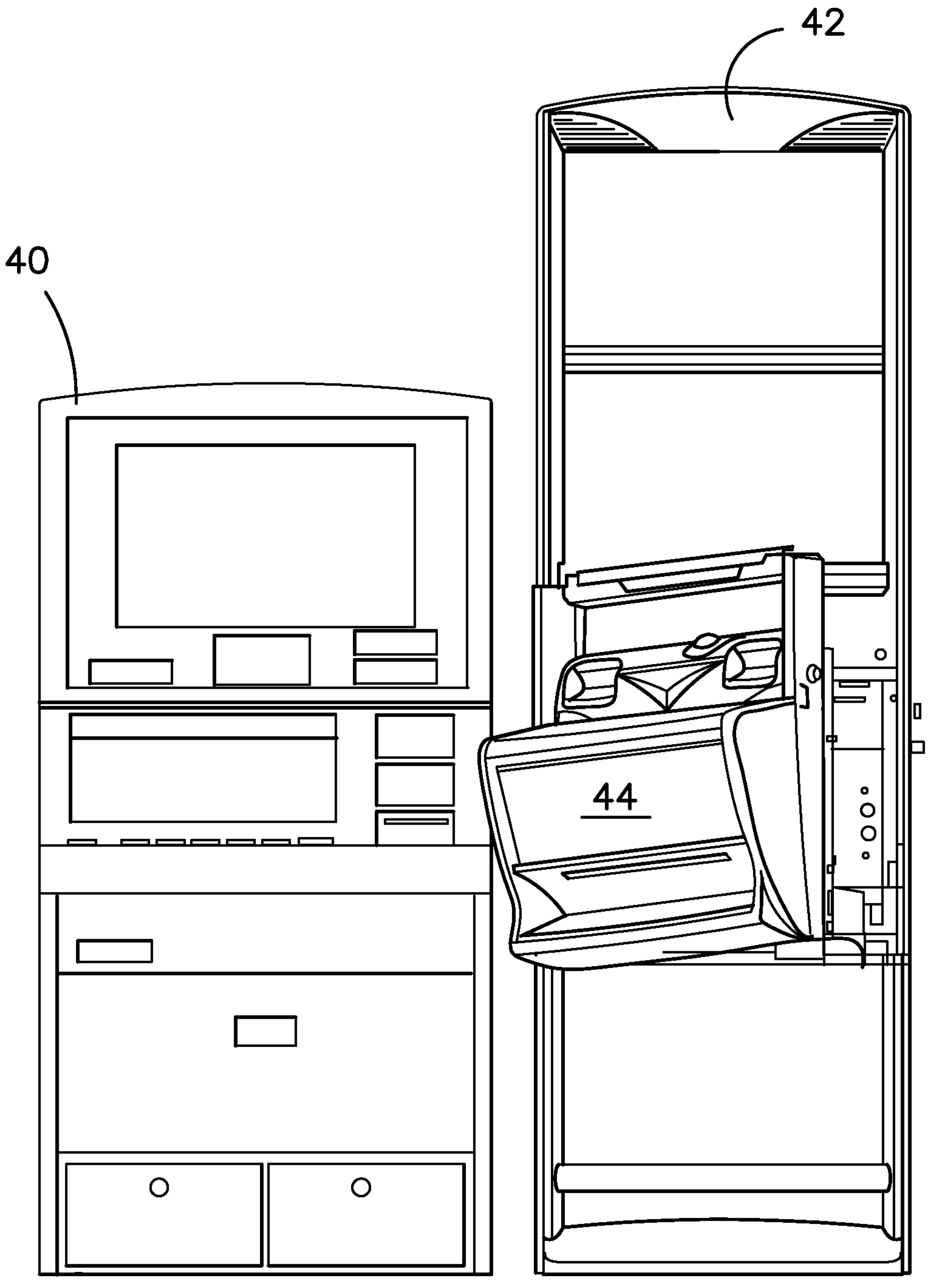
FIG. 4 is front view of the prior art slant top gaming machine next to an upright gaming machine of FIG. 3, with the access door of the upright machine partially open.

In FIG. 3, a prior art slant top gaming machine 40 is shown directly next to a conventional upright gaming machine 42. It will be appreciated that the gaming machines are shown at standard distances from each other, or pitch, as they would be on a gaming floor. As shown in FIG. 4, when the vertically hinged access door 44 of the upright gaming machine 42 is opened, it traverses laterally outwardly thereby contacting and fouling the side of the prior art slant top gaming machine 40. Therefore, without more clearance between the machines, the access door 44 is not able to be fully opened and the upright machine 42 cannot be emptied or serviced. Those familiar with the gaming industry will appreciate that, for this reason, it is not space efficient to place slant top gaming machines directly next to upright gaming machines on a gaming floor.

Figure 5:
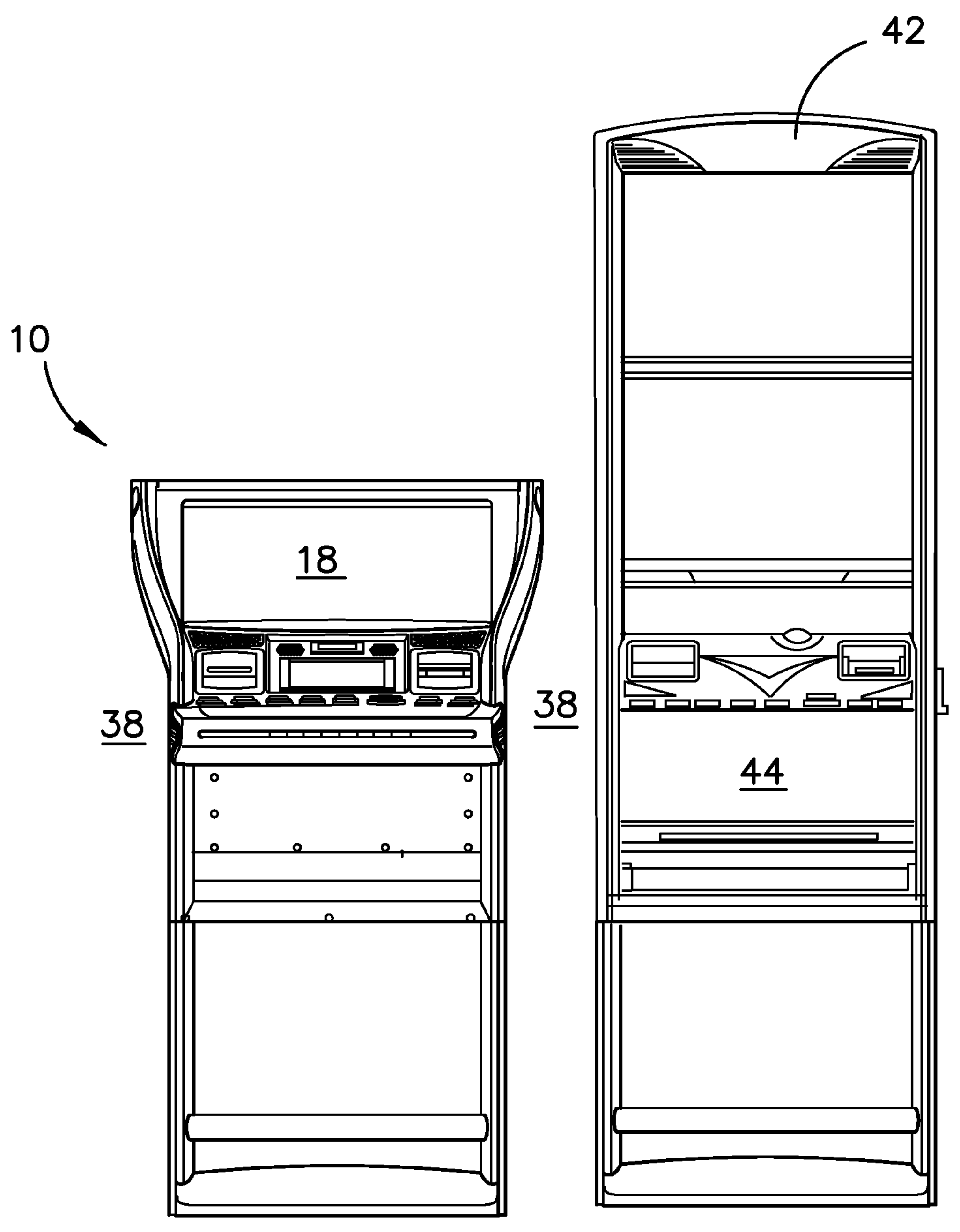
FIG. 5 is front view of the gaming machine of FIG. 1 next to an upright gaming machine.
Figure 6A:
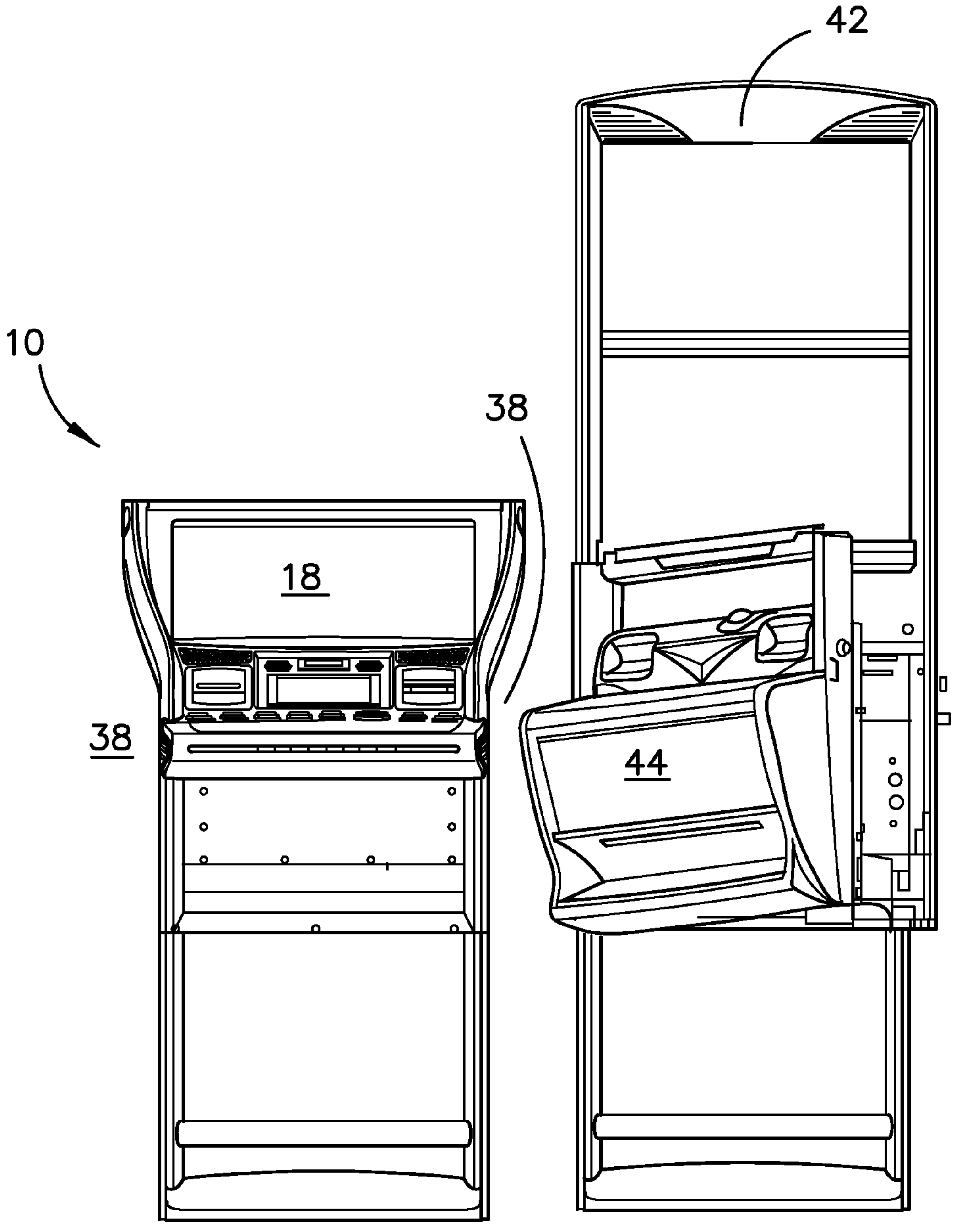
FIG. 6A is front view of the gaming machine of FIG. 1 next to an upright gaming machine, with the access door of the upright machine partially open.
Figure 6B:
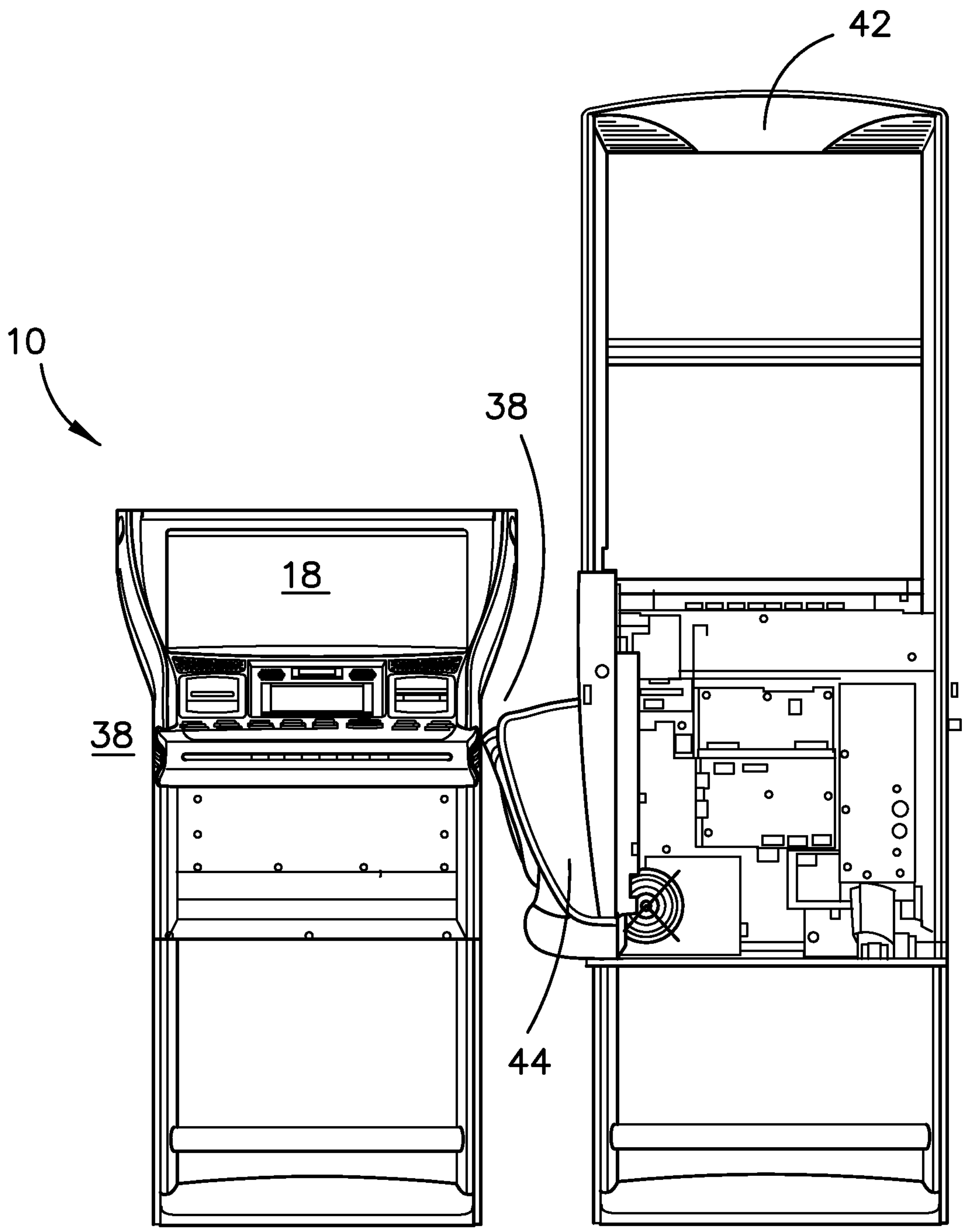
FIG. 6B is front view of the gaming machine of FIG. 1 next to an upright gaming machine, with the access door of the upright machine fully open.

Referring now to FIG. 5, the gaming machine 10 of the present invention is shown located next to the same upright gaming machine 42. When in this position, it can be seen with reference to FIGS. 6A and 6B that clearance areas 38 provide enough space for the access door 44 of the upright machine to be fully opened without fouling.

Returning now to FIG. 2, it is proposed that the frontal width WL of the lower portion 16 is generally in the range of 70 to 90% of the maximum frontal width WH of the upper portion 14 and preferably in the range of 75 to 85% to provide sufficient clearance areas 38. In the illustrated embodiment, the width of the lower portion is approximately 82% of the maximum width of the upper portion. Specifically, in the illustrated embodiment, the maximum width of the upper portion is approximately 560 mm (22 inches). Similarly, it is proposed that in the illustrated embodiment, the lateral width provided by each clearance area 38 will be in the order of 62 millimeters (2.44 inches). It should also be understood that, in the illustrated embodiment, the frontal width WL of the lower portion is approximately equal to the frontal width of a conventional upright gaming machine.

Figure 7:
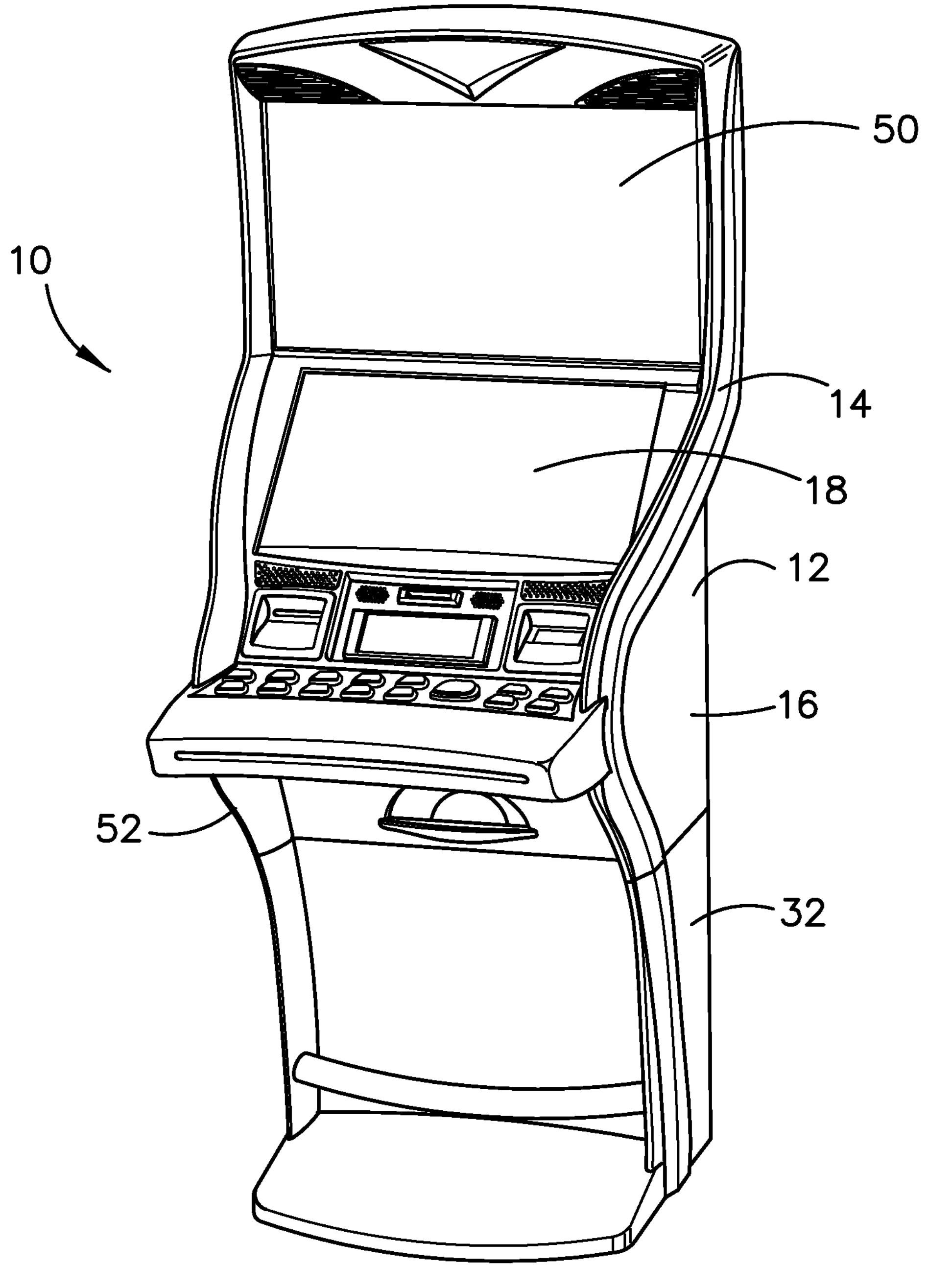
FIG. 7 is a perspective view of a gaming machine on FIG. 1 in accordance with a common variation having a dual screen.

As best shown in FIG. 7, in accordance with a common variation known in the art, gaming machine 10 is also adapted to include a secondary display 50, commonly referred to as a "topper", located above the primary display 18. It should be noted that the secondary display 50 is generally vertically extending, yet maintains the maximum width of the upper portion of the cabinet 12.

Figure 8:
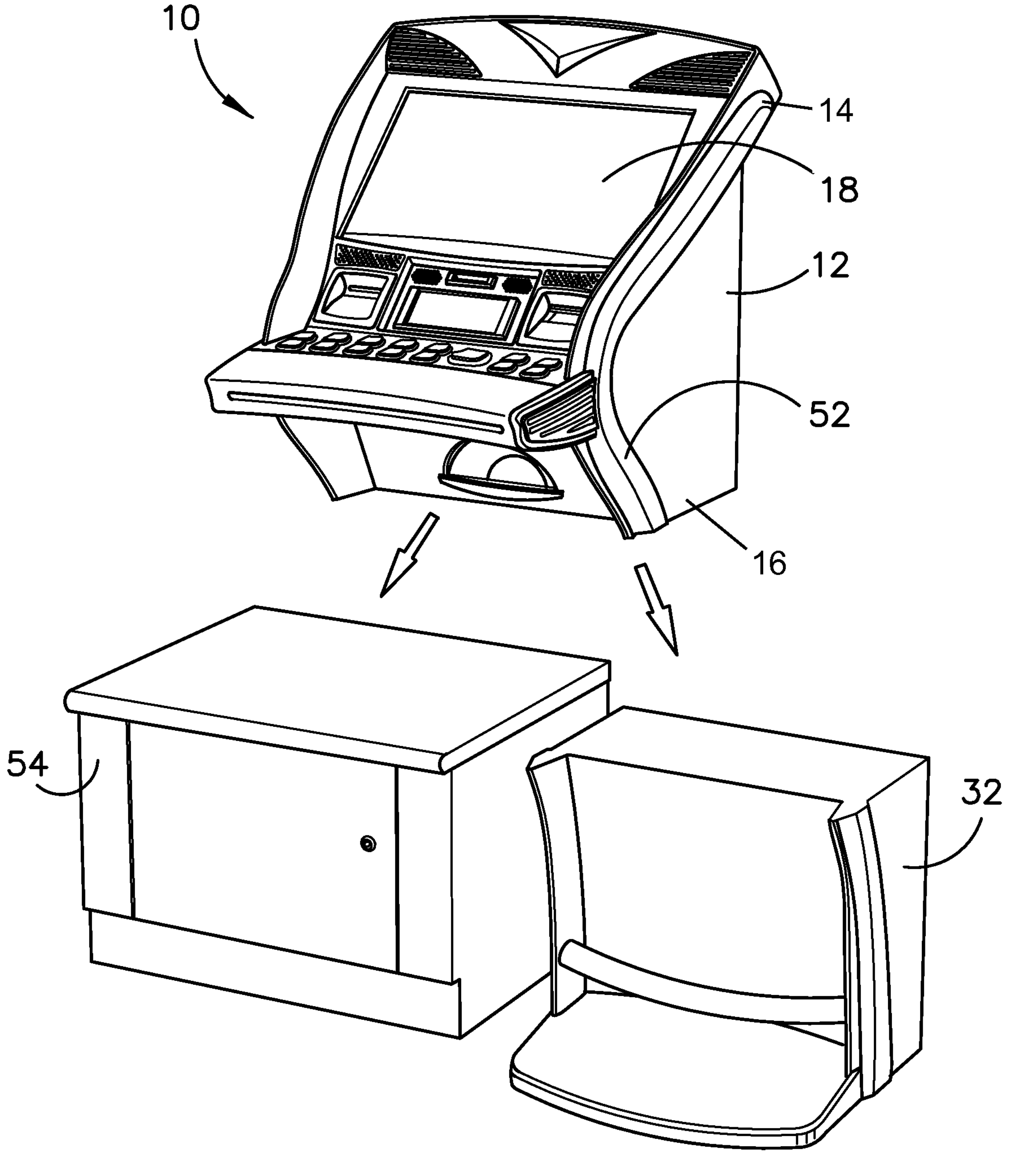
FIG. 8 is a perspective view of a gaming machine of FIG. 1 showing a removable pedestal and optional console mounting.

A further aspect of the gaming machine 10 of the present invention is depicted in FIG. 8. To provide further alternatives for its placement on the gaming floor, the pedestal 32 is removable from the cabinet 12. In the illustrated embodiment, the pedestal is easily removable by opening the horizontally hinged access door 52 to access a pair of connecting fixing devices (not shown). Upon removal of the fixing devices, the pedestal 32 may be easily removed from the lower portion 16.

Figure 9:
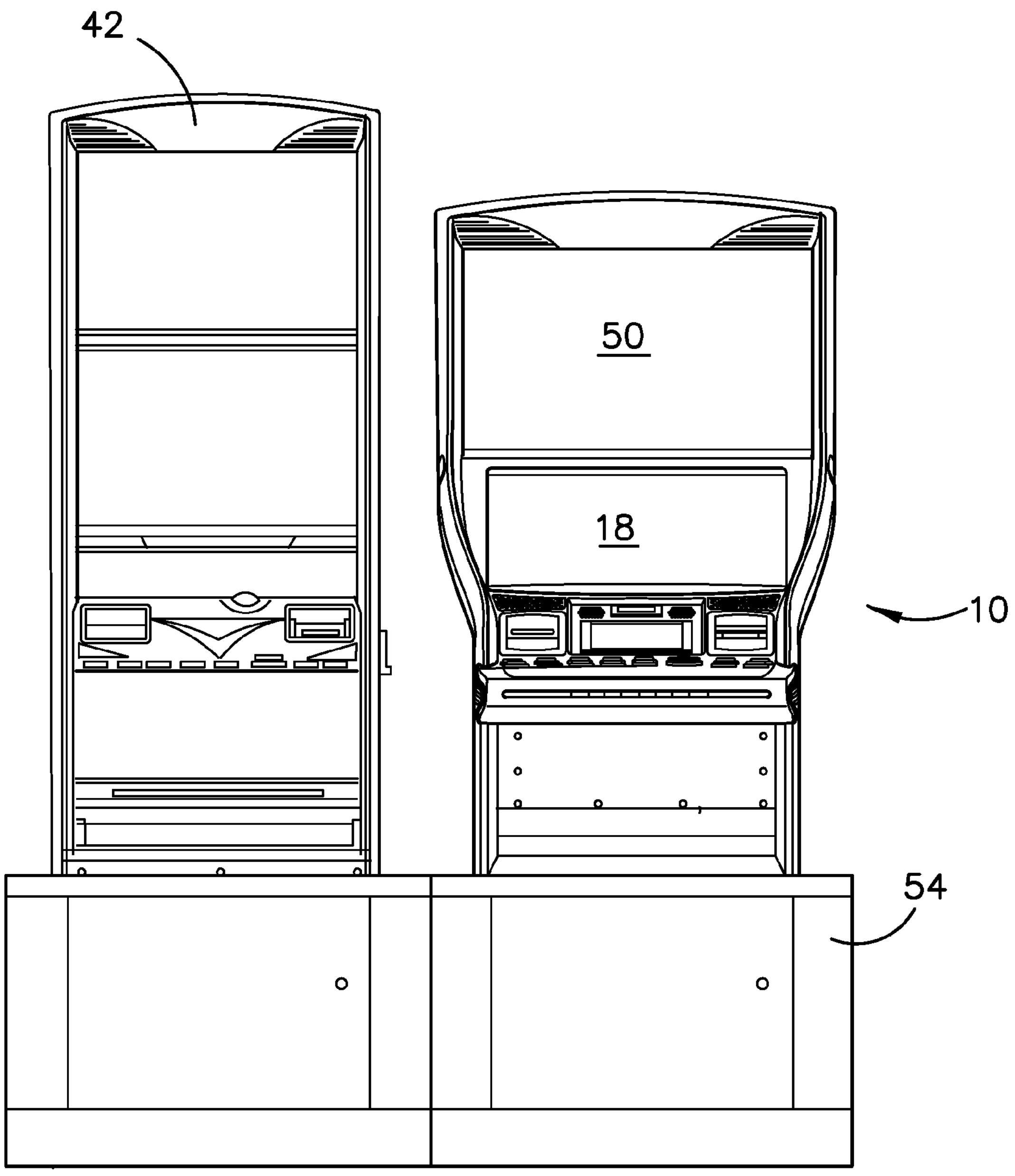
FIG. 9 is a perspective view of a gaming machine of FIG. 7 sitting on a common console next to an upright machine.

Advantageously, as shown in FIG. 9, once the pedestal is removed the gaming machine 10 can be placed on a console 54, in a similar way to the upright gaming machine 42. It should be understood that the pedestal 32 can be removed even when the gaming machine includes the secondary display 50.

Figure 10:
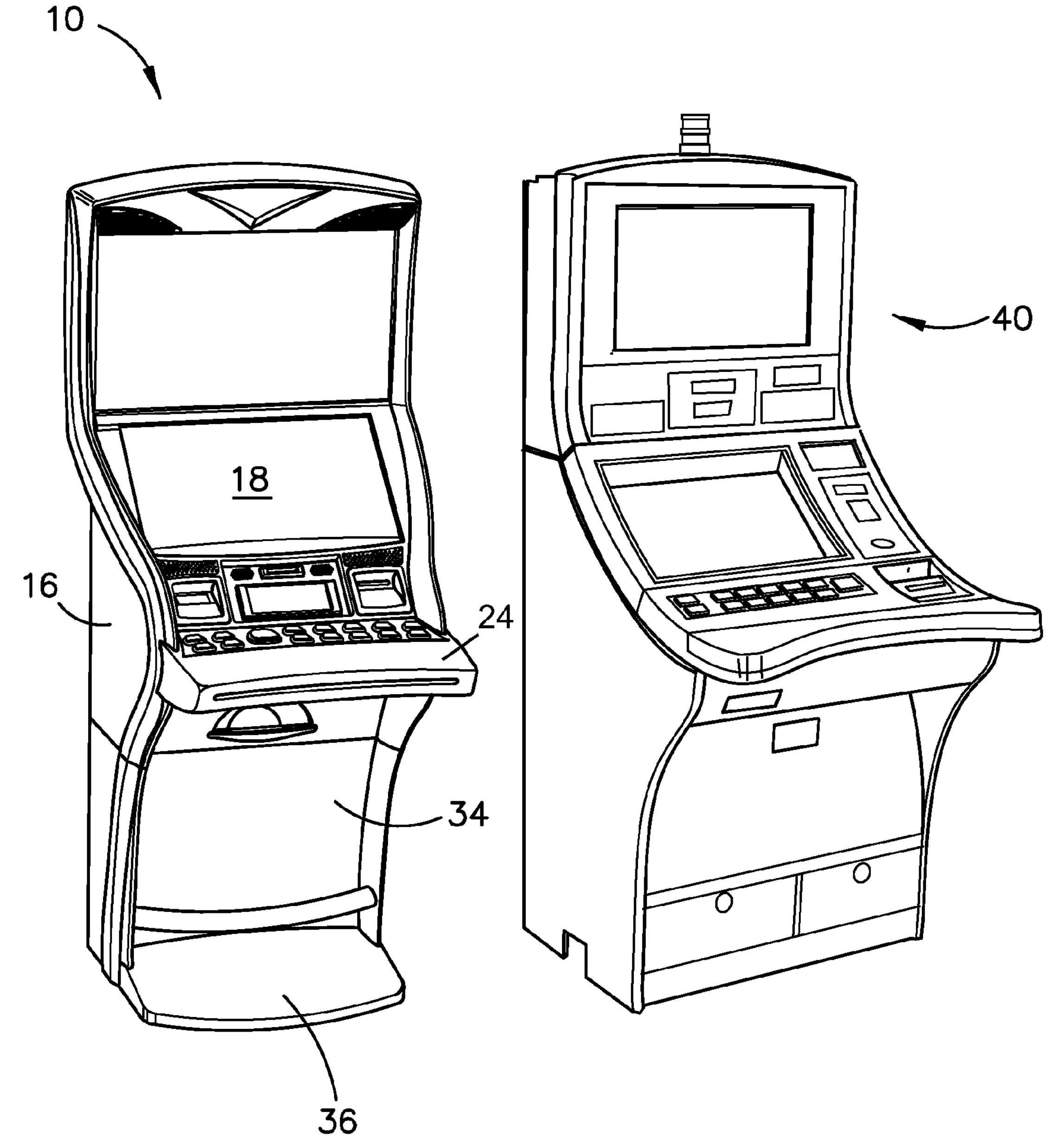
FIG. 10 is front view of the gaming machine of FIG. 7 next to a prior art slant top machine.

To summarise the differences and advantages of the present invention, FIG. 10 shows gaming machine 10 next to conventional slant top gaming machine 40. As can been seen, the lower portion 16 is less bulky and slenderer than the conventional slant top, yet, because the upper portion retains a similar size, gaming machine 10 retains the ergonomic advantages of slant top machines. That is, a large angled primary display comfortably sitting at a lower height and an extended armrest area 24. Also, when not located on a console, gaming machine 10 provides an under machine relief area 34 for a user's legs and footrest 36 in a similar way to a normal gaming table/slant top machine.

In use, the gaming machine 10 of the present invention is used like any other type of slant top gaming machine whereby the user comfortably sits in front of the machine to begin play.

Figure 11:
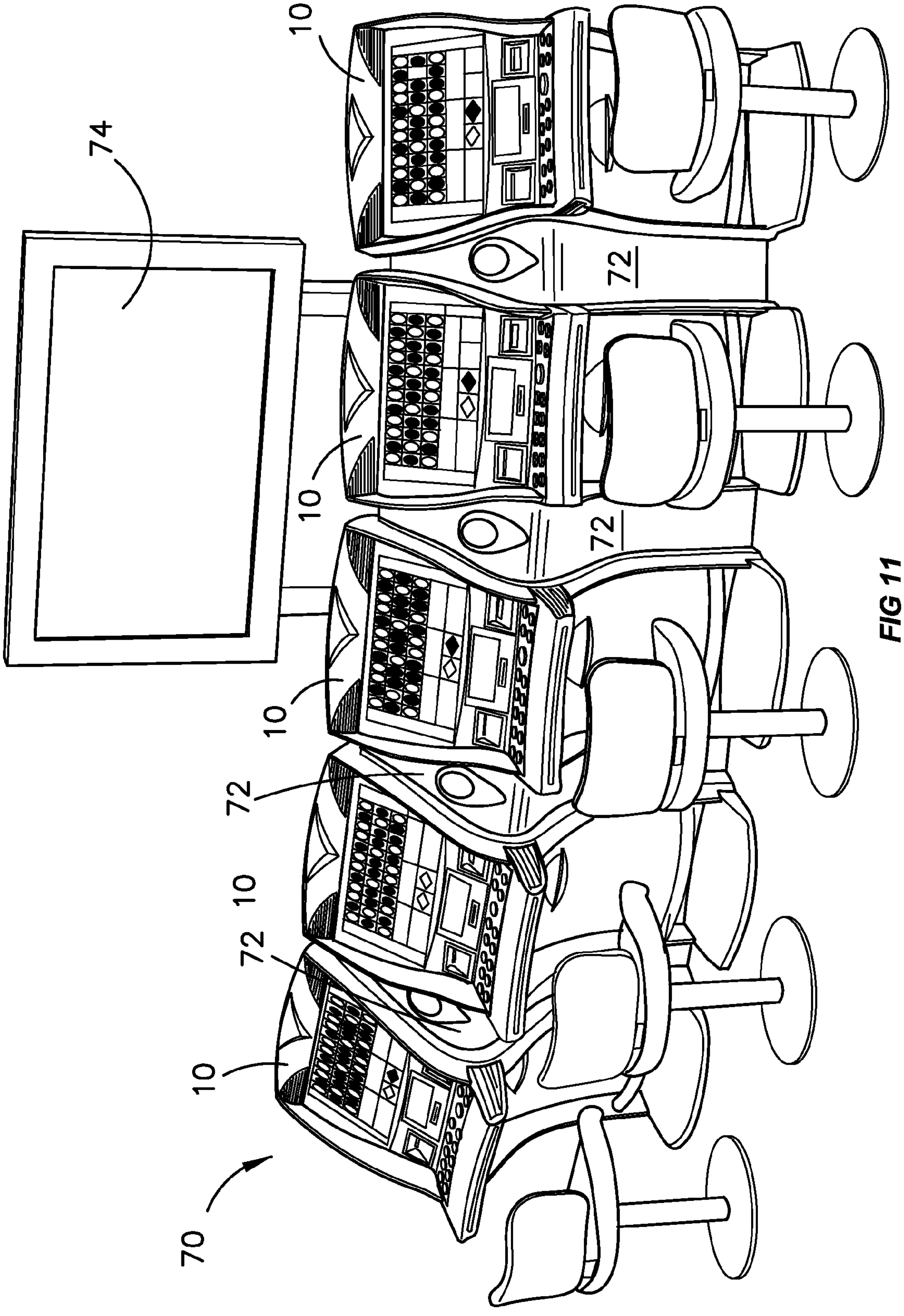
FIG. 11 is a perspective view of a bank of the gaming machines of FIG. 1.

Referring now to FIG. 11, the gaming machine 10 may also be networked into a bank of machines 70 whereby a group of players can interact with a central gaming operator or display 74 such as when the game machine is programmed to play for example roulette or blackjack. As shown, each gaming machine is separated by a joiner section 72 in order to simulate a multi user gaming table. Advantageously, the modularity and reduced footprint of gaming machine 10 allows the bank of machines 70 to be built up relatively easier than prior art slant top gaming machines.

As should be now self evident, the gaming machine of the present invention ameliorates most of the disadvantages of conventional slant top gaming machines and yet retains many of the advantages in that it can be placed anywhere on a gaming floor in a similar way to an upright gaming machine, occupies a similar footprint and is similarly easy to move around. Moreover, due to its relatively slenderer appearance, more gaming machines can be placed within a given area and/or next to upright gaming machines, increasing gaming machine densities. The modularity provided by the removable pedestal removes further limitations, advantageously providing gaming floor designers with even more options with respect to their placement and configuration.

Although the invention has been described with reference to specific examples, it will be appreciated by those skilled in the art that the invention may be embodied in many other forms.

The invention claimed is:

1. A slant top gaming machine comprising:

a cabinet having an upper and lower portion;

a primary display disposed in said upper portion and that extends at approximately 0 to 45 degrees to the horizontal; and a user interface and a horizontally hinged access door disposed in said lower portion;

wherein the maximum frontal width of said lower portion is substantially less than the maximum frontal width of said upper portion thereby defining clearances under said upper portion on each side of said lower portion, said width of said upper portion tapering to said maximum frontal width of said lower portion, and wherein said slant top gaming machine is releasably engageable with a removable pedestal such that said slant top gaming machine may be supported on said pedestal.

2. A gaming machine according to claim 1, wherein the lateral width of each said clearance is substantially identical.

3. A gaming machine according to claim 1, wherein said maximum frontal width of said lower portion is generally in the range of 70 to 90% of said maximum frontal width of said upper portion.

4. A gaming machine according to claim 1, wherein said maximum frontal width of said lower portion is generally in the range of 75 to 85% of said maximum frontal width of said upper portion.

5. A gaming machine according to claim 1, wherein said maximum frontal width of said lower portion is substantially 82% of said maximum frontal width of said upper portion.

6. A gaming machine according to claim 1, wherein said maximum frontal width of said upper portion is approximately 560 mm.

7. A gaming machine according to claim 1, wherein said user interface includes a button panel.

8. A gaming machine according to claim 1, wherein said pedestal has a frontal width, which is substantially the same as the width of said lower portion.

9. A gaming machine according to claim 1, wherein said gaming machine is a casino type gaming machine.

* * * * *

UNITED STATES PATENT AND TRADEMARK OFFICE

CERTIFICATE OF CORRECTION

PATENT NO. : 9,033,806 B2
APPLICATION NO. : 13/813210
DATED : May 19, 2015
INVENTOR(S) : Vincent Carmelo Bruzzese et al.

It is certified that error appears in the above-identified patent and that said Letters Patent is hereby corrected as shown below:

In the Claims

In Column 6, line 26, in Claim 1, delete “releasably”.

In Column 6, line 27, in Claim 1, delete “engageable with,” and insert -- completely disengageable from --, therefor.

In Column 6, line 28, in Claim 1, insert -- removably -- before “supported”.

Signed and Sealed this
Sixth Day of October, 2015

Michelle K. Lee
*Director of the United States Patent and Trademark Office*